United States Patent
Fleischmann

Patent Number: 6,064,924
Date of Patent: May 16, 2000

[54] METHOD AND SYSTEM FOR PREDICTING SHIP MOTION OR THE LIKE TO ASSIST IN HELICOPTER LANDING

[75] Inventor: Dominique S. Fleischmann, London, United Kingdom

[73] Assignee: Lockheed Martin Corporation, Bethesda, Md.

[21] Appl. No.: 08/984,231

[22] Filed: Dec. 3, 1997

[30] Foreign Application Priority Data

Dec. 4, 1996 [GB] United Kingdom ............... 9625266

[51] Int. Cl.⁷ ................ G06F 7/70; G08B 21/00
[52] U.S. Cl. .......... 701/16; 244/116; 340/945; 340/958; 701/3
[58] Field of Search ............... 701/16, 3, 14, 701/21, 120; 244/116, 135 A, 114 R; 340/946, 948, 952, 953, 954, 945, 947, 949, 950, 958; 114/261, 144 B, 266, 122, 144 R; 356/153

[56] References Cited

U.S. PATENT DOCUMENTS

| | | |
|---|---|---|
| 3,091,751 | 5/1963 | Greenberg . |
| 3,665,168 | 5/1972 | Canfield ..................... 701/21 |
| 3,843,263 | 10/1974 | Snead ........................ 356/153 |
| 3,878,805 | 4/1975 | Stevenson ................. 114/261 |
| 4,414,532 | 11/1983 | Kaul .......................... 340/953 |
| 5,089,972 | 2/1992 | Nachman et al. ........ 364/478.06 |
| 5,123,615 | 6/1992 | Wagner et al. ............ 244/116 |
| 5,398,635 | 3/1995 | Tellington ................. 114/261 |
| 5,687,930 | 11/1997 | Wagner et al. ............ 244/116 |

FOREIGN PATENT DOCUMENTS

| | | |
|---|---|---|
| 2063003A | 5/1981 | United Kingdom . |
| 2128833A | 5/1984 | United Kingdom . |

*Primary Examiner*—Jacques H. Louis-Jacques
*Attorney, Agent, or Firm*—Antony P. Ng; Andrew J. Dillon; Robert P. Cogan

[57] ABSTRACT

A method for a short-term prediction of future ship motion in open water to furnish visual cueing information that can be remotely presented to a pilot during an aircraft landing is described. Two sets of samples of the sea surface geometry along a radial azimuth line from a ship as a function of elevation of a sensor are first acquired. These are compensated to remove the components due to the ship's motion. Two wave traces are then separately derived in Cartesian format from the two sets of acquired samples. These wave traces are subjected to a Fast Fourier Transform to detect the amplitudes and phases of the individual wavelength components. The direction of the wavelength components is determined using a measure of their phase change in the scan direction during the time interval between the two scans together with their measured wavelength. The amplitude, direction and phase of each component is utilized together with the known motion characteristics of the moving ship in order to derive a short-term prediction of future ship motion in the time domain. A quiescent period of the ship motion is located by comparing the short-term prediction with the pre-defined operating limit criteria. Finally, a message signal is transmitted to the pilot of the aircraft indicating Time-to-Land and the duration of the quiescent period.

22 Claims, 8 Drawing Sheets

METHOD AND SYSTEM FOR PREDICTING SHIP MOTION OR THE LIKE TO ASSIST IN HELICOPTER LANDING

BACKGROUND OF THE INVENTION

1. Technical Field

The present invention relates to a method and system for motion prediction in general and, in particular to a method and system for predicting the motion of a ship. Still more particularly, the present invention relates to a method and system for a short-term prediction of future ship motion to provide visual cueing information to assist a pilot during a helicopter landing.

2. Description of the Prior Art

Landing a helicopter on the deck of a moving ship is not an easy task even when the weather is good and the water is calm. Deteriorating weather conditions and the associated increase in ship motion certainly make the helicopter landing on the deck of a moving ship almost an insurmountable task. Hence, in a broad sense, the safe operational envelope of a helicopter is partially limited by the weather conditions which, at times, is so adverse that all helicopter operations must be suspended.

Needlessly to say, in a Search and Rescue situation, many lives can be saved if the operational envelope of a helicopter can be safely extended without putting the helicopter pilot (and rescuer) at risk. In a combat role, the ability of a military helicopter to operate in various weather conditions always provides an advantage over the opposing force.

Currently, there are procedures that a ship command can employ for improving the safety of helicopter landing on the deck of a moving ship. These procedures include changing ship heading relative to the waves or changing ship speed for reducing ship motion. However, most of these procedures are performed under subjective human judgment along with some necessary conservative margins, which, more than often, results in larger ship heading changes, larger ship speed changes, or even premature suspensions of helicopter operations than theoretically necessary. Consequently, it would be desirable to provide an improved system for assisting a pilot to land a helicopter on the deck of a moving ship.

Typically, the landing of a helicopter on the deck of a moving ship may be divided into four distinct phases, as follows:

1. Initial approach: involves approaching to a distance of a few hundred meters from the moving ship.
2. Tracking the ship: involves tracking a parallel course with the moving ship by taking up a position to the port side level with the flight deck at an altitude of around 20 meters.
3. Hovering over the deck: involves hover-taxiing from the tracking position of phase 2 to a position over the deck.
4. Final landing: involves the final vertical descent onto the deck of the ship.

Several minutes may be spent in phase 2 whilst the pilot judges the best moment to start phase 3. Phase 3 and phase 4 are normally conducted in a single smooth maneuver and, generally, it only takes about 30 seconds to perform both phase 3 and phase 4 completely. However, badly timed approaches may require the pilot to remain hovering in close proximity near the deck, waiting for a period of suitably benign ship motion. Such circumstances may result in sustaining phase 3 and phase 4 up to two minutes.

One objective of the present invention is to provide a short-term prediction of future ship motion during phase 2 for indicating when a period of quiescent ship motion is imminent such that the pilot is cued to start phase 3 and phase 4 as prompted. For the purpose of this invention, short-term is taken to mean in the order of 40 seconds into the future.

SUMMARY OF THE INVENTION

In view of the foregoing, it is therefore an object of the present invention to provide an improved method and system for motion prediction.

It is another object of the present invention to provide an improved method and system for predicting motion of a ship.

It is yet another object of the present invention to provide an improved method and system for a short-term prediction of future ship motion in open water to furnish visual cueing information that can be remotely presented to a pilot during a helicopter-landing approach.

In accordance with the method and system of the present invention, two sets of samples of the sea surface geometry along a radial line from a ship as a function of elevation and azimuth of a sensor are first acquired. Two wave traces are then separately derived from the two sets of acquired samples. These wave traces are subjected to a Fast Fourier Transform to detect the amplitudes and phases of the individual wavelength components. The direction of the wavelength components is determined utilizing a measure of their phase change in the scan direction the time interval between the two scans together with their measured wavelength. The amplitude, direction and phase of each component is utilized together with the known motion characteristics of the moving ship in order to derive a short-term prediction of future ship motion in time domain. A quiescent period of the ship motion is located by comparing the short-term prediction with pre-defined operating limit criteria of a helicopter. Finally, an indication is given to the pilot of the helicopter as to when it will be best for landing.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention is described with respect to an embodiment for providing a short-term prediction of future ship motion at sea. As described, the present invention is utilized for enhancing visual cueing information which can be remotely presented to a pilot during a helicopter-landing approach. Although a helicopter is utilized to illustrate the present invention, those skilled in the art will appreciate that the present invention may also be applicable to fixed-wing aircraft. In addition, the present invention is also applicable for providing a feed-forward control input to an active stabilization system utilized by any type of vessel, ship, or floating structure, and the scope of the present invention extends to such embodiments.

I. OVERVIEW

Figure 1:
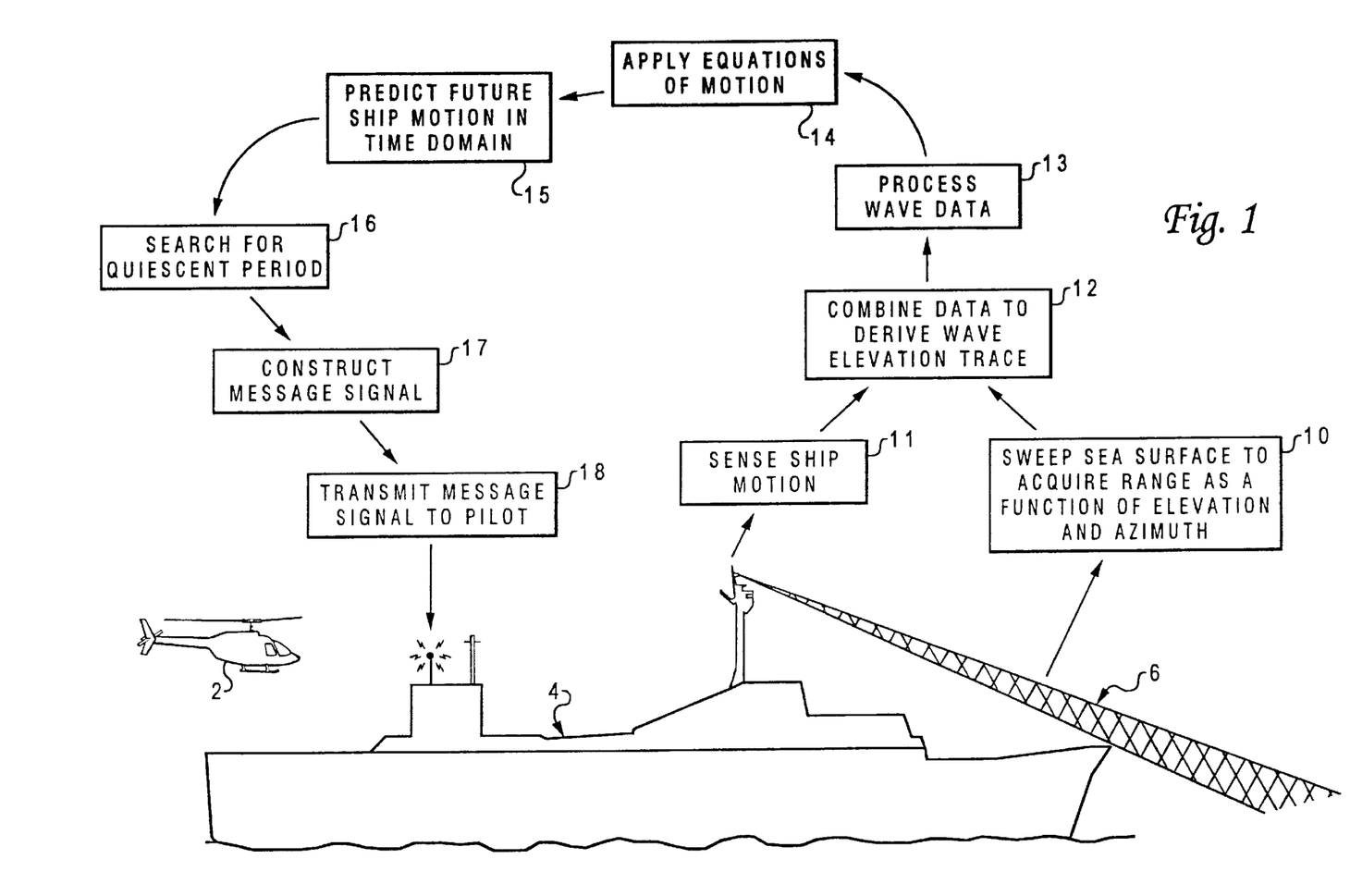
FIG. 1 is a functional block diagram of a method and system for predicting ship motion to assist in helicopter landing, according to a preferred embodiment of the present invention.

Referring now to the drawings and in particular to FIG. 1, there is depicted a functional block diagram of a method and system for predicting short-term ship motion to assist in landing a helicopter 2 on a ship 4, according to the preferred embodiment of the present invention. For present purposes, short-term is taken to mean of the order of 40 seconds into the future. First, a range-measuring sensor is utilized to sweep (as shown at 6) and measure the precise distance between the sensor and the sea surface as a function of elevation and azimuth, as shown in block 10. In addition, motion sensors are utilized to measure the motion of ship 4, as depicted in block 11. Subsequently, both of these data are combined to derive a wave elevation trace, as illustrated in block 12, in a local earth-tangent plane coordinate frame by way of standard coordinate frame transformations. In this way, the effect of ship movement, and hence sensor movement, is eliminated. Then, the wave data is processed by performing a Fourier analysis on the wave data to determine the underlying components of the wave frequency, amplitude, phase, and direction, as indicated by block 13. The results extrapolated forward in time and applied to a pre-defined motion characteristic of the ship, defined by equations of motion, in order to make a prediction of short-term future ship motion in the time domain, as shown in blocks 14, and 15. A quiescent period of the ship motion is subsequently located by comparing the predicted motion with predetermined ship/helicopter operating-limit criteria for ship motion, and a message signal is constructed, as illustrated in blocks 16 and 17. Finally, an indication is given to the pilot of the helicopter as to when the pilot should land the helicopter. For example, a message signal may be transmitted to the pilot indicating Time-to-Land and the duration of the expected quiescent period, as shown in block 18.

II. EQUIPMENT

In the preferred embodiment of the invention, the system for providing a short-term prediction of future ship motion at sea can be divided into three types of elements, namely, data acquisition elements, a central processing element, and a set of interfaces.

A. Data Acquisition Elements

Data acquisition elements include a range-measuring sensor operative as a wave height and distance-measuring sensor, which is mounted rigidly to the ship at a position suitable to provide a good line of sight for a circular sea area surrounding the ship. Either passive or active optical-range-finding theodolites are considered suitable. However, passive optical sensors in the infra-red range may be preferred. The data acquisition elements should acquire for a given azimuth an accurate line of sight range measurement from the sensor "head" to the sea surface as a function of sensor elevation.

The optical range-measuring sensor may be based on a laser. In principle, sensors operating at other frequencies may alternatively be utilized, for example microwave sensors or radar, or a sensor using passive binocular video ranging. It will be a matter of empirical determination as to which of these is better for any given application. In any event, for a given azimuth, the sensor scans over a vertical arc, so as to derive point measurements on a polar plot that give a representation of the shape of the sea surface looking along that azimuth direction, from close to the ship, e.g. 50 meters away, to at least a reasonable distance away from the ship, e.g. 800 meters.

Ship motion is sensed by three sensor elements. The pitch and roll heading of the ship are measured by utilizing a commercially-available gyroscope having an electrical signal output to a central processing element. In the preferred embodiment of the invention, an update rate of approximately 20 Hz from the gyroscope is preferred. The heave displacement of the ship is measured by utilizing a commercially-available accelerometer likewise providing an electrical signal output to the central processing element. In the preferred embodiment of the invention, an update rate of approximately 20 Hz from the accelerometer is again preferred. The speed of the ship through water is measured by utilizing the ship's log equipped with a suitable electronic interface to provide frequent updates to the central processing element automatically. In the preferred embodiment of the invention, an update rate of approximately 2 Hz from the ship's log is preferred.

B. Central Processing Element

A central processing element is responsible for processing various kinds of data obtained from the data acquisition elements and for producing message signals. These message signals inform the pilot, flight deck officer, and the ship's command whether or not the ship's motion will remain within certain landing envelope limits during a window of prediction.

Figure 2:
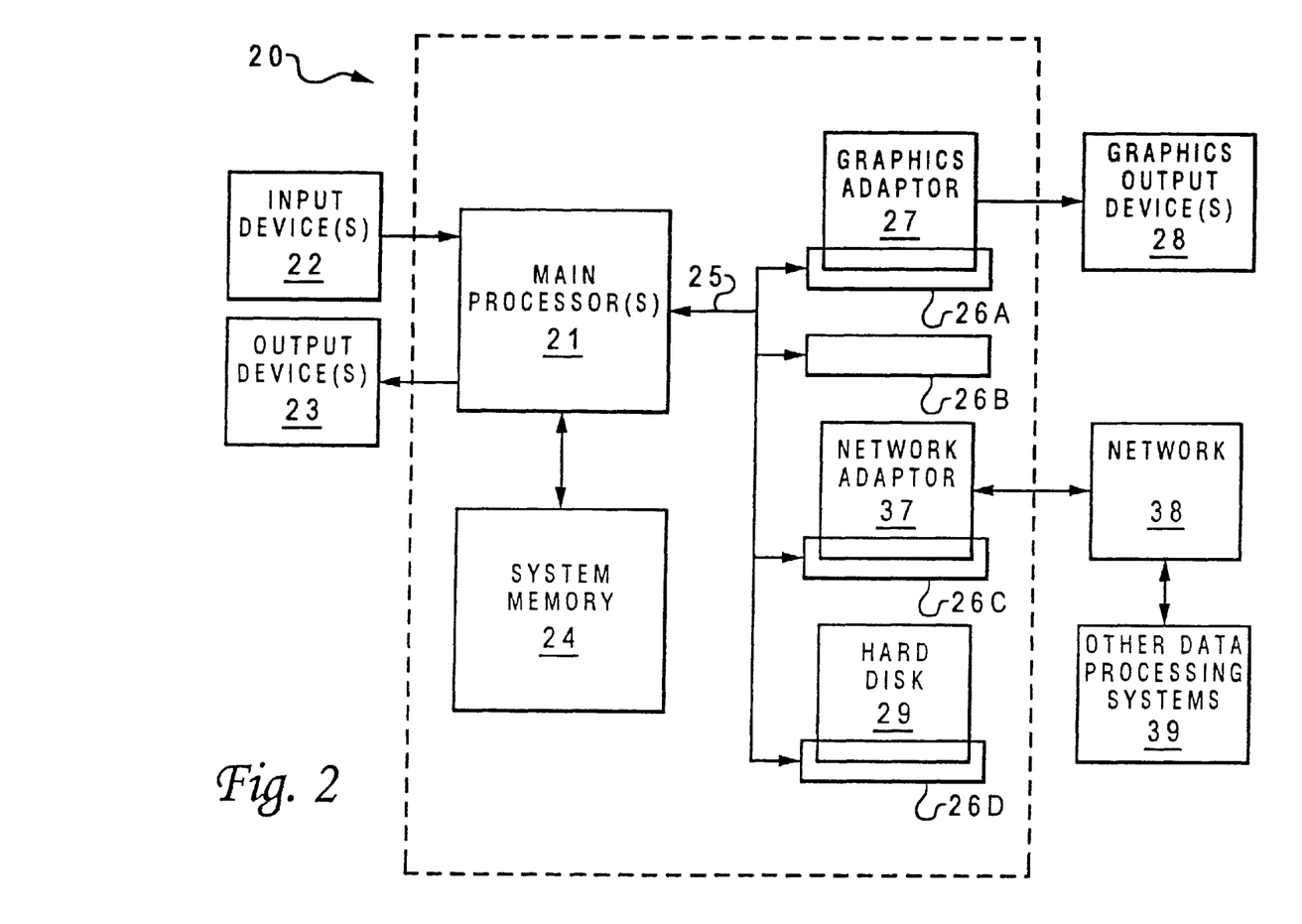
FIG. 2 is a block diagram of the components for a computer that may be utilized as a central processing element according to a preferred embodiment of the present invention.

With reference now to FIG. 2, there is illustrated a block diagram of computer 20 that may be utilized as the central processing element according to the preferred embodiment of the invention. Computer 20 includes main processor(s) 21 coupled to a system memory 24, having input device(s) 22 and output device(s) 23 attached thereto. Main processor(s) 21 may include a single processor or multiple processors. Input device(s) 22 may include a keyboard or other types of input device. Output device(s) 23 may include a monitor or other types of output device. A number of peripheral devices may be connected to adaptor slots 26A, 26B, 26C, and 26D in order to provide communications with main processor(s) 21 via an I/O (input/output) bus 25. As shown in FIG. 2, a graphics adaptor 27, a network adaptor 37, and a hard disk 29 are connected to adaptor slots 26A, 26C and 26D, respectively, while adaptor slot 26B remains open. Graphics adaptor 27 receives instructions regarding graphics from main processor(s) 21 via I/O bus 25, thereby rendering the desired graphics output from main processor(s) 21 to graphics output device(s) 28. Network adaptor 30 may communicate with other data processing systems 39 across network 38. Hard disk 29 receives instructions from main processor(s) 21 regarding writing and reading information to and from hard disk 29.

C. Interface Elements

Interface elements are based around a personal computer having appropriate interface cards to communicate with the optical range sensor, the gyroscope, the accelerometer the ship's log, and the signal to the pilot and crew.

III. IMPLEMENTATION

Figure 3:
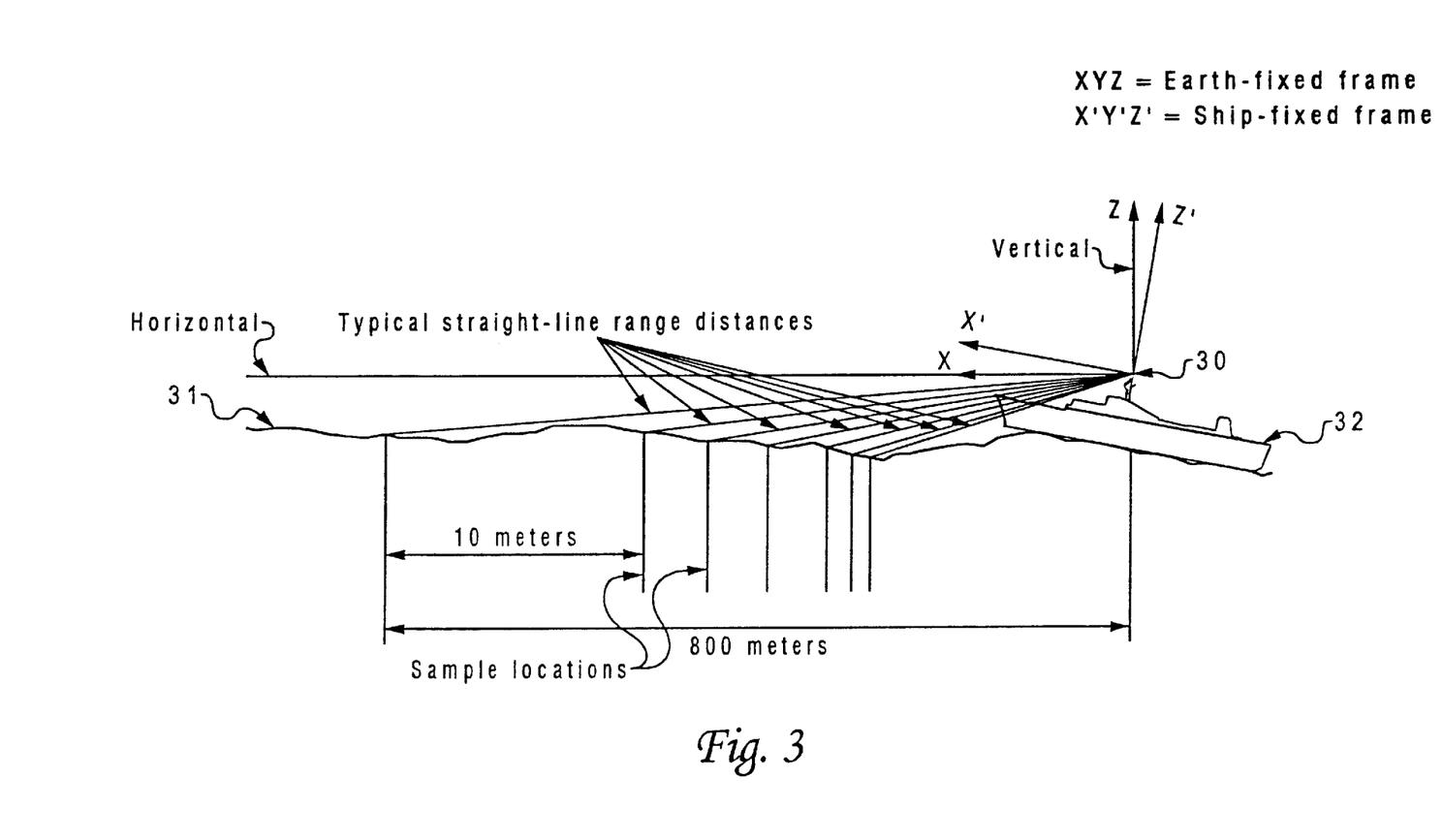
FIG. 3 is a graphical illustration of how data acquisition is performed in accordance with a preferred embodiment of the invention.

Referring now to FIG. 3, there is illustrated graphically how data acquisition is performed in accordance with the preferred embodiment of the invention. The figure illustrates very diagrammatically a vertical section through a ship 32 and the sea ahead of ship 32. A sea surface is represented by an irregular wave shape 31. Ship 32 moves relative to the sea surface and is shown diagrammatically in a position of substantial pitching. A range sensor 30, mounted on ship 32, is utilized to measure a straight-line distance from sensor 30 radially out from ship 32 along a ship-fixed ship-centered frame of reference (X', Y', Z'), as a function of elevation. Sensor 30 may be rigidly mounted to the mast of ship 32 and has an optical mechanism that can be rotated precisely in both azimuth and elevation. In an alternative arrangement, the head of sensor 30 may be gyroscopically stabilized. A scan is performed for a given azimuth over a fixed range of elevation to make sure that, irrespective of the attitude of ship 32, sensor 30 can acquire data between a position close to the ship 32 and a predetermined distance away from the ship, e.g. 800 meters. In practice, this is quite close in elevational terms to the horizon (X-axis). To do this, a fixed scan elevation range is set which takes into account the maximum attitude limits (pitch and roll) of ship 32.

Samples are acquired at incremental steps of elevation of sensor 30 preferably corresponding to once every ten meters along the water surface over the entire measurement range from close to the ship to 800 meters away. Following the Nyquist principles, this means that the system can detect wavelengths in excess of 20 meters. To achieve this at the small grazing angles at the outer end of this range while keeping the elevation step size constant as a function of elevation, those samples taken closer to ship 32 will typically result in being spaced much closer than 10 meters. This is shown in FIG. 3, which illustrates how a constant elevational step size, chosen so as to give a 10 meter sample spacing when 800 meters from the ship, will give more closely spaced samples near to the ship. Even if the closest sample to the ship is 50 meters, there are still likely to be well in excess of a hundred samples, for example 300 samples.

Each acquired range measurement can be organized in the form of a matrix having N columns by 2 rows. Each column corresponds to each sampling point, within which one row contains a range value (preferably in meters) while the other row contains a sensor elevation angle. The range thus measured is not the horizontal range but is the slant range, that is the distance measured at the current elevation angle. Thus, each column contains the coordinates of a unique sample point in two-dimensional planar-polar coordinates. In the preferred embodiment of the invention, N is about 300 for each range measurement at a particular azimuth.

A set of N data points for a single scan is preferably acquired within one second. The data acquisition must be acquired in as small a time interval as possible for two reasons. First, in order to reduce processing time of the measurements, it is important that the data at the beginning of the scan is contemporaneous with the same data at the end of the scan. This ensures that there will be no significant skewing of the wave-phase information between samples. Needless to say, time is required to acquire each sample, and therefore, there has to be some time delay between samples. Such time delay is acceptable as long as it is kept to a minimum. Second, in order to further reduce processing time of the measurements, it is important that the attitude and displacement of the sensor itself and therefore the ship in the earth-fixed frame does not change significantly during the acquisition of data. The amount of time delay which is acceptable is directly related to the dynamics of the ship deck itself. It is expected that rotation in the plane of the scan will affect the geometry quite significantly. A measure taken at the beginning of the scan at an elevation (in the ship-fixed ship-centered frame) of, say, 2° may intercept the water at a distance from the ship of, say, 800 meters. If there is a significant delay in the data acquisition elements and the ship rotates significantly during that time, then, at the end of a scan, that same 2° elevation may now be aiming above the horizon. Roll is expected to be the most arduous of dynamic modes with angular rates of up to 6° per second for a typical vessel on which this invention is employed. It should be noted that if ship 32 is gyroscopically stabilized, then the effect of ship motion during a scan will be significantly reduced.

After a fixed time delay of preferably two seconds, a second scan is made at the same earth-fixed azimuth as the first scan. The second scan is performed in an identical manner as the first scan; however, if the ship heading has changed within the two-second period since the first scan, then the sensor should be rotated so that the second scan takes place at the same earth-fixed azimuth angle.

Figure 4A:
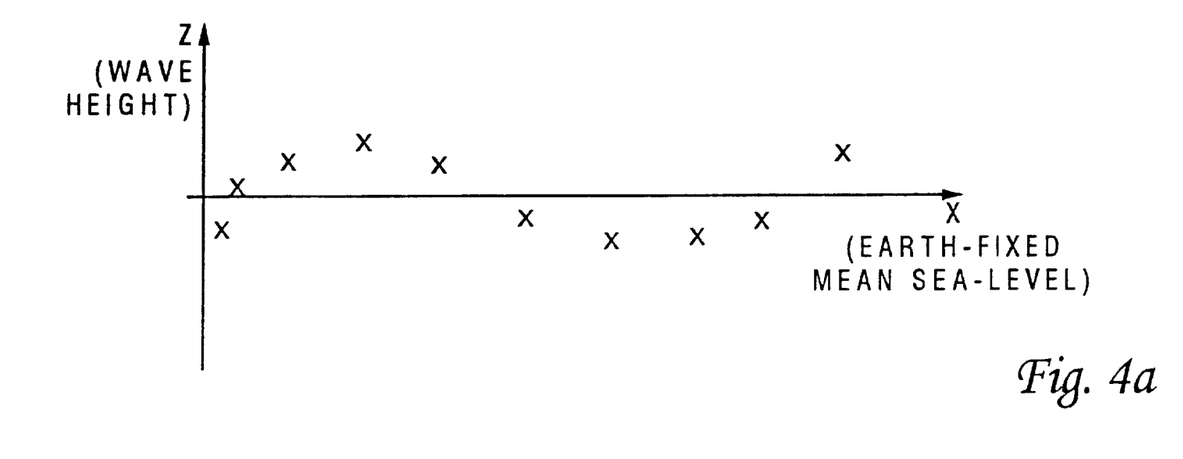
FIG. 4a illustrates several acquired wave height samples plotted in a Cartesian representation.

The two arrays of data points individually produced by the first and second scan can be interpreted as coordinates in a spherical ship-fixed ship-centered reference frame. Each of the two data sets represents a wave profile trace in the space domain. These data points are then transmitted to the central processing element. In the central processing element, each sample is transformed into a earth-fixed Cartesian coordinates X, Y and Z, with the origin at the ship's position as shown in FIG. 3. Standard translation and rotation techniques, which are well-known in the art, are first utilized taking into account the attitude data from the gyroscope and the heave data from the accelerometer to convert the two sets of data from the ship-fixed ship-centered reference frame to an earth-fixed coordinate reference frame with the origin at the ship's position. That is, the ship's movement as sensed by the ship motion sensors is effectively subtracted from the range-measurement sensor output. The data is then held as pairs of range or distance measurements and elevational angular measurements, i.e. in polar or r$\theta$ form. This data is now converted from polar form to Cartesian form by utilizing a standard polar-to-Cartesian transformation. The resultant data pairs now comprise distance from the ship verses vertical height, and can be plotted as shown FIG. 4a. The horizontal distance is plotted on the X-axis and the wave is plotted on the Z-axis. Conveniently the wave heights are normalized to have the zero height at the mean wave height such that each wave height value goes above and below zero.

Figure 4B:
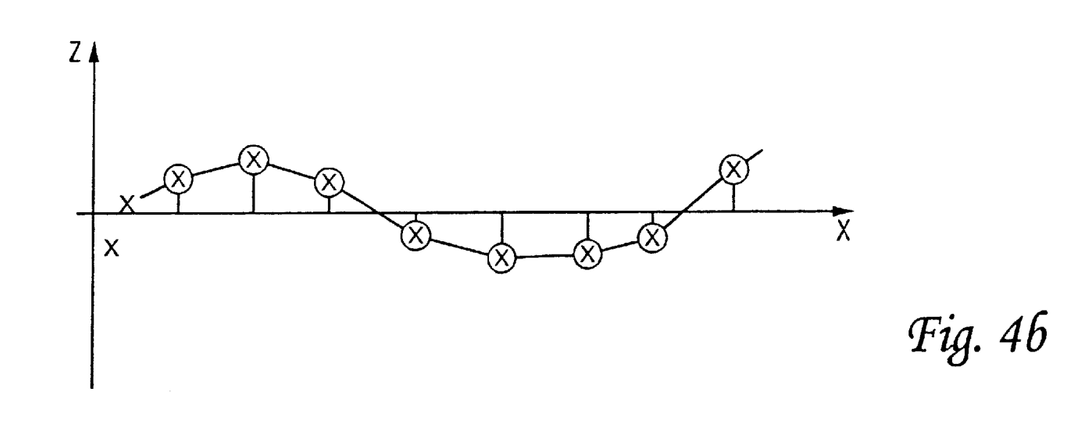
FIG. 4b illustrates the same acquired wave height samples after processing to provide equi-spaced samples.

The two data sets are then prepared so that their Fast Fourier Transform (FFT) can be calculated. Such preparation involves processing of the space-domain wave profile traces to reconstruct (interpolate) any large sections of missing trace that may be caused by a wave crest casting a "shadow" on a trough behind. Finally, the two data sets are interpolated to give two sets of coordinates at equally-spaced distances from the ship, as shown in FIG. 4b. Preferably, the total number of samples is about the same before and after the interpolation.

A Fourier transform can transform spatial data to frequency data; in other words, can transform information from a spatial domain to a frequency or time domain. A Fast Fourier Transform is an implementation of the Fourier transform which is fast enough to be utilized on real-time data.

Figure 5:
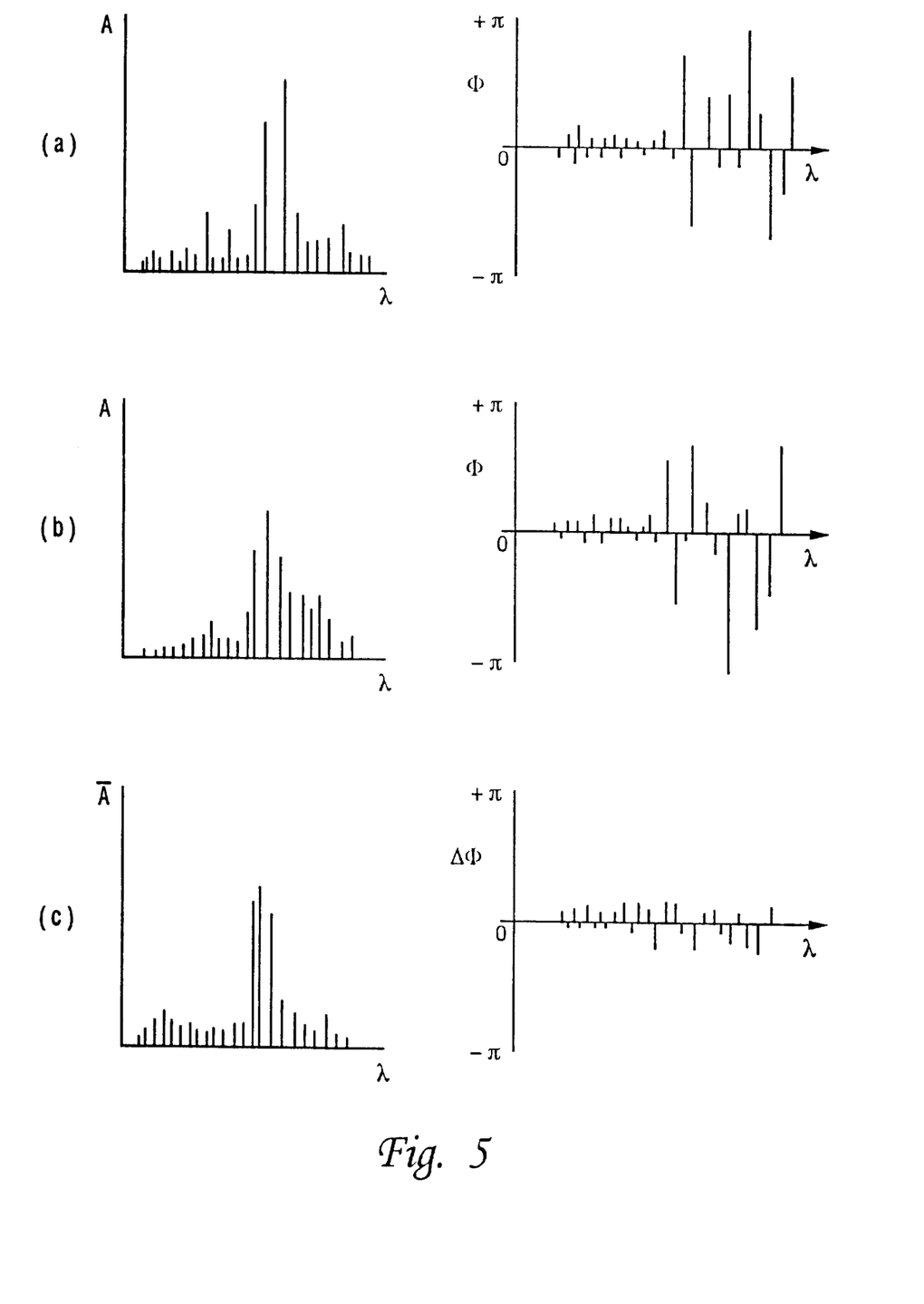
FIG. 5 depicts various amplitudes/phase diagrams obtained by utilizing a Fast Fourier Transform.

A space domain FFT is calculated for each of the two data sets in the central processing element. For an FFT of data collected in the space domain, the abscissa of the power spectral density function is interpreted as the frequency or inverse wavelength. The FFT generates in the frequency domain values of (a) amplitude and (b) phase for each of the frequency components in the wave shape being analyzed. The shortest wavelength (maximum frequency) is twice the distance between samples. The number of measurements obtained in the frequency domain is essentially equal to the number of samples in the spatial domain and they are equally spaced in the frequency (inverse wavelength). The amplitudes and phases obtained are illustrated in FIG. 5. As this operation takes place twice, two sets of amplitudes and phases are obtained as shown at plot (a) and plot (b) in FIG. 5. It will be shown below that a measure is required of the change in phase of each of the wave components which occurs in the two second interval between the two scans. At plot (c) in FIG. 5 the difference in the phase diagrams of plot (a) and plot (b) are taken. The phase shift experienced in the two-second interval is calculated by subtracting the phase value of the first scan from the phase value at the corresponding $\lambda_M$. Appropriate mathematical techniques are utilized to resolve the phase shift into the interval 0 to $2\pi$. Also shown at plot (c) are the averages of the amplitudes shown in the amplitude diagrams at plot (a) and plot (b), which are conveniently taken as the amplitudes of the wave components. The amplitudes and phases of the Fourier series are stored for both of the wave surface profiles in an array of N columns corresponding to the wavelengths (frequencies) of the FFT and three rows—the first row containing the amplitudes, the second row containing the phase information (0 to $2\pi$), and the third row containing the corresponding wavelength.

The data are subsequently filtered through a bandpass filter to remove high frequencies (short wavelengths) which are known to have an insignificant effect on the motion of the ship. At this point, the measured data is ready to be utilized for a short-term prediction calculation. The data gives the wavelengths and phases of the wave components as perceived along the azimuth on which the measurement was made. The measurements are obtained at two instants in time separated by the fixed time delay, preferably two seconds which is chosen such that the waves being detected will have moved only a small fraction of a wavelength.

Theoretically, the speed of a water wave, C, travelling in deep water is given by the following equation:

$$C = \sqrt{\frac{g\lambda_T}{2\pi}} \tag{1}$$

where g=gravity and $\lambda_T$=wavelength of the water wave in the direction of travel. Thus, in a fixed time period between scans (i.e., two seconds), each wave component will travel a distance, D in the direction of travel, given by:

$$D = t\sqrt{\frac{g\lambda_T}{2\pi}} \tag{2}$$

where t=time between scans. Hence, the corresponding phase shift, $\Delta\phi$, between a first scan and a second scan is theoretically given by:

$$\Delta\phi = 2\pi\left(\frac{t\sqrt{\frac{g\lambda_T}{2\pi}}}{\lambda_T}\right) \tag{3}$$

Figure 6:
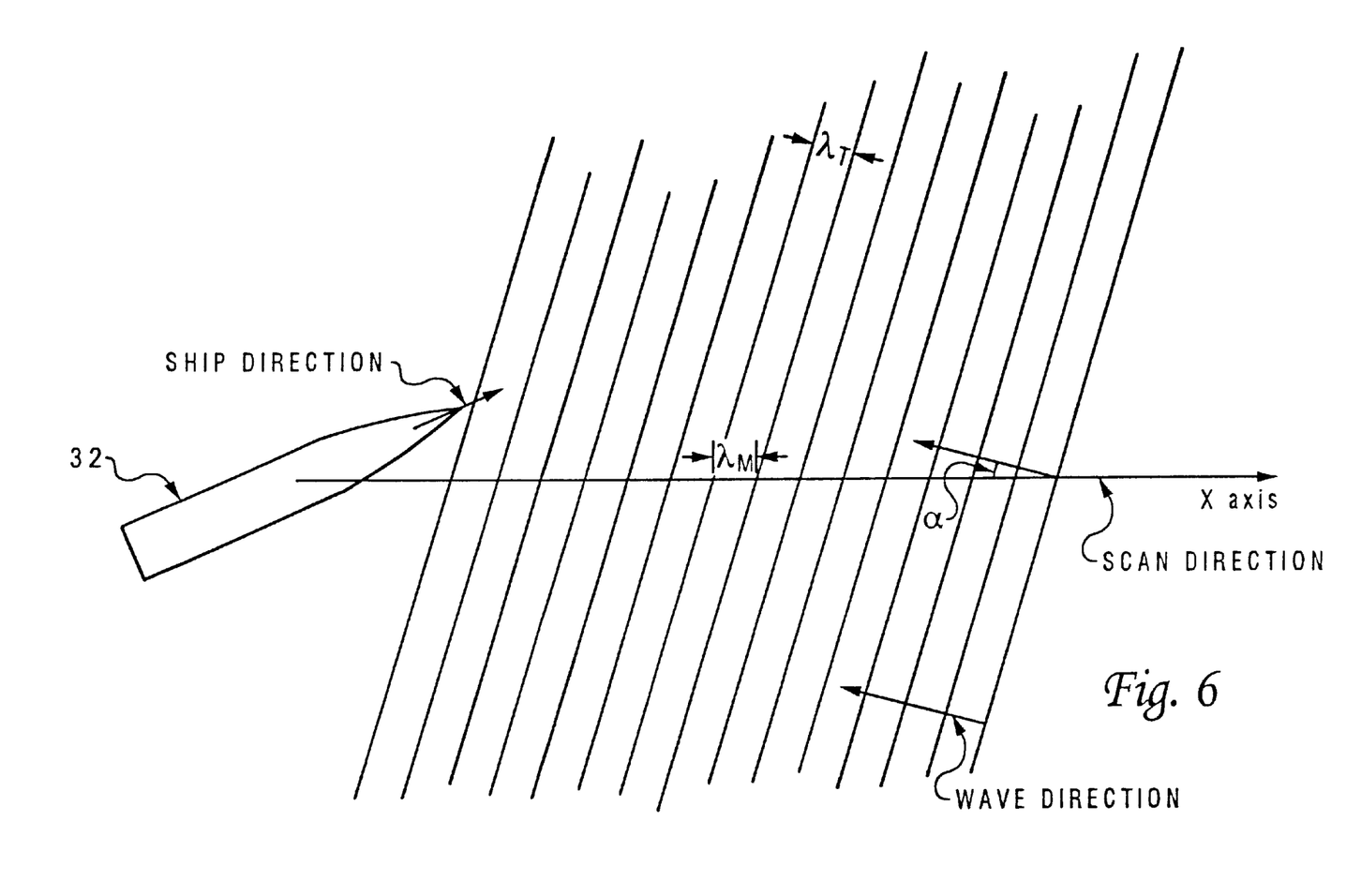
FIG. 6 is a plan view of a typical wave component showing the scan direction.

If a particular wave component is travelling parallel to the azimuth angle of the two scans, then one would expect to see a difference between the phases in the phase arrays of the two scans equal to $\Delta\phi$. The phase shifts of most, if not all, wave components will disagree with the value of $\Delta\phi$ calculated theoretically. The amount by which the measured $\Delta\phi$ differs from the calculated $\Delta\phi$ is dependent upon the angle $\alpha$ at which the real wave of that wavelength is travelling with respect to the azimuth angle of the two scans. This is shown in FIG. 6 in which ship 32 is travelling at an arbitrary direction and a scan made from ship 32 in the X direction. A single wave component is illustrated by equi-spaced parallel lines representing the wave peaks or crests. In general the waves will be at an arbitrary direction relative to the scan direction, and the difference between the scan direction and the direction of wave travel is shown by the angle $\alpha$. The displacement in the scan direction during the measurements taken two seconds apart gives rate change of phase, or a wave speed, which corresponds to a theoretical wavelength $\lambda_T$. However, the actual measured wavelength $\lambda_M$ in that direction is different.

Figure 7:
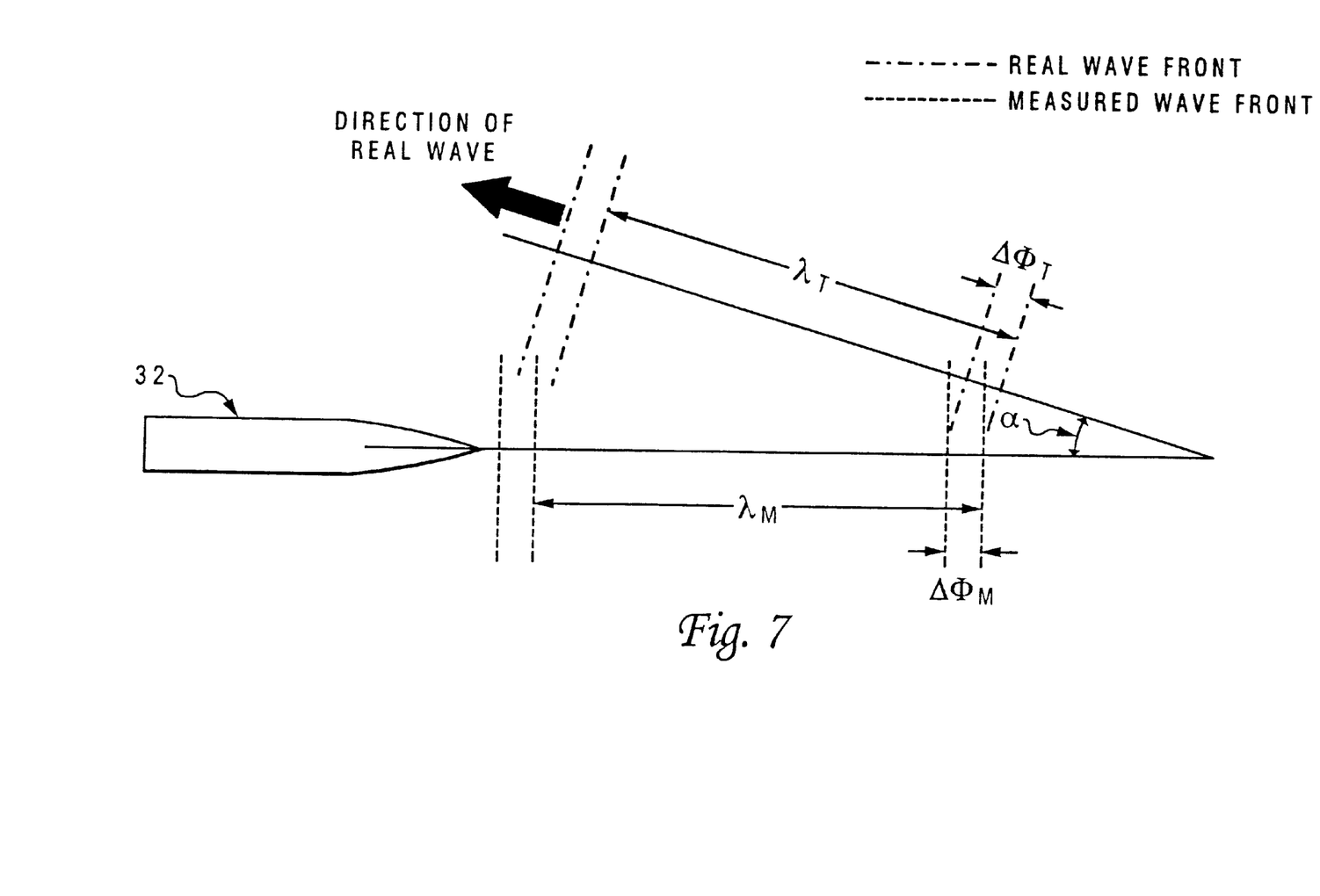
FIG. 7 is a graphical depiction of the wave phase geometry based on FIG. 5.

With reference now to FIG. 7, there is graphically depicted the wave phase geometry. The angle of propagation of each true wave can be determined from the measured phase shift, as follows:

$$\lambda_T = \lambda_M \cos\alpha \tag{4}$$

where $\lambda_T$=true wavelength calculated from the phase displacement between the two measurements and $\lambda_M$=measured wavelength. The distance moved by the wave as seen in the measurement or scan direction is the distance D divided by cos $\alpha$. The phase shift is then divided by the wavelength in that direction, multiplied by $2\pi$ to express it in radian. Thus:

$$\Delta\phi_M = \frac{2\pi}{\lambda_M} \cdot \frac{D}{\cos\alpha} \tag{5}$$

Substituting for D from equation (2) gives:

$$\Delta\phi_M = \frac{2\pi}{\lambda_M} \cdot \frac{t\sqrt{\frac{g\lambda_T}{2\pi}}}{\cos\alpha} \tag{6}$$

Thus, utilizing equation (4):

$$\Delta\phi_M = \frac{2\pi}{\lambda_M} \cdot \frac{t\sqrt{\frac{g\lambda_M \cos\alpha}{2\pi}}}{\cos\alpha} \tag{7}$$

This can be re-arranged to give:

$$\cos\alpha = \frac{2\pi t^2 g}{\Delta\phi_M^2 \lambda_M} \quad (8)$$

Or $$\alpha = \arccos\left(\frac{2\pi t^2 g}{\Delta\phi_M^2 \lambda_M}\right) \quad (9)$$

Thus $\alpha$ can be derived from the measurements of $\lambda_M$ and $\Delta\phi_M$.

To confirm the angle $\alpha$ obtained from equation (9), the sensor may be commanded to a corresponding azimuth of each subsequent calculated true wave direction, and a second pair of scans may be performed to calculate angle $\alpha$ a second time specifically to check that the angle $\alpha$ does equal to is close to 0°. This will eliminate the ambiguity as to whether the angle $\alpha$ is clockwise or anti-clockwise. Many repeat pairs of scans may be performed to confirm the directions of the various wave components detected in the initial pair of scans. Knowing $\alpha$, then $\lambda_T$ can be found from equation (4). The above processing is executed for each value of $\lambda_M$, or at least each value which is of significant amplitude.

The phase shift measured between the first and second scans in a pair is dependent on the change in the ship's position between the two scans. The phase measured at any given wavelength will be shifted by an amount proportional to the component of the ship's forward speed in the direction of the scan and multiplied by the time between scans. If the ship has significant forward speed, then this effect may become significant and it may need to be accounted for. The effect is accounted for by subtracting the following term from each of the measured phase shifts before performing the calculations to isolate the angle $\alpha$:

$$\alpha = \frac{2\pi(V\,T\cos\beta)}{\lambda_M} \quad (10)$$

where V is the speed of the ship, T is the time between scans, $\beta$ is the angle between the azimuth of the scan and the ship's heading, and $\lambda_M$ is the measured wavelength.

Waves travelling either parallel or obliquely to the direction of the scans can be detected by utilizing the equation for angle $\alpha$ described above. Waves travelling exactly perpendicular to the direction of the scans generally do not manifest themselves in the AC components of the Fourier coefficients. To avoid the risk of ignoring these components, three special pairs of scans are performed in a very low frequency at the scan azimuth direction +90°, scan azimuth direction +180°, and scan azimuth +270° in order to check whether other wave components were developing at an angle which is near or perpendicular to the original scan azimuth. If such components do exist, then the "base" azimuth angle can be adjusted accordingly to provide the best coverage. This also ensures that components are not lost as a result of changes in the ship's direction.

The phase, true wavelength, amplitude, direction and time of detection of each wave component are isolated and placed in a database. As scans are repeated, more and more wave components will be stored. Once the database has been well populated, subsequent pairs of scans may be utilized to check for the presence of these components specifically. If a particular component no longer exists in the sensed data, that particular component will be deleted from the database. This process is repeated at a rate comparable with the statistically non-stationary nature of the sea state. That is, the data is continually updated to take account of the changing wave components.

The sea surface geometry data stored in the database now completely represents the wave components present in the sea around the ship by defining the amplitude, wavelength, direction, and phase and instant in time at which the phase was measured, for each frequency or wavelength component which is present.

The amplitude response of a ship is assumed to be linearly proportional to the amplitude of the exciting wave. The constant of linear proportionality or gain, sometimes referred to as a Transfer Function or Response Amplitude Operator (RAO), is assumed to be dependent upon three conditions, namely, the wavelength of the wave, the angle of the wave (relative to the ship) and the speed of the ship.

Several methods have been developed for theoretically predicting these gains based on the geometry and mass properties for any arbitrary ship form. These methods, and the theory they embodied, are widely accepted within the Naval Architecture profession. It is commonly understood that gains computed according to theoretical calculations can be systematically arranged in a computer-based look-up table or matrix with the following three indices: wavelength, wave angle and ship speed. Thus, a constructed matrix would contain six gains in each cell address corresponding to every combination of wavelengths, wave angles and ship speeds—each gain corresponding to one of the six degrees of rigid body freedom—pitch, roll, yaw, heave, surge, and sway, namely rotation about and translation along the three principal axes. Along with the gains, phase lags are also produced from the theoretical calculations and must also be stored at each cell address. This gives rise to a total of twelve items of numeric information at each cell address in the matrix.

Typically, the matrix calculations are performed "off-line" for each ship design. Subsequently, the computed gain and phase lag data are incorporated as a look-up table to be stored in the memory of the central processing unit. This look-up table may be accessed any time during the operation of the system. As a preferred embodiment of the invention, the look-up table has a size of about 30 wavelengths, 18 wave directions (between 0 and 180°) and 15 ship speeds.

For a ship travelling at a specific speed, its response in each of the six degrees of freedom to a single wave can be computed by multiplying the amplitude of the wave by one of the six gains corresponding to that condition and applying the corresponding phase lags according to the equation below:

$$\text{Ship's State} = A^* G^* \sin(\phi_W + \phi_L) \quad (11)$$

where A=wave amplitude; G=transfer function gain for that degree of freedom; $\phi_W$=phase of the wave; $\phi_L$=transfer function phase lag for that degree of freedom.

If the ship/wave condition being examined does not correspond to the values stored in the matrix exactly, the values of gains and phase lags can be approximated by a tri-linear interpolation (or three-dimensional linear interpolation) of the immediate adjacent values in the matrix.

When a ship is sailing in an open sea having more than one wave component present, the ship's state can be calculated as the linear summation of all responses to each individual wave component according to the equation given below:

$$\text{Ship's State} = \sum_{i=1}^{N} A_i G_i \sin(\phi_{W_i} + \phi_{L_i}) \quad (12)$$

where N=number of wave components present. For each wavelength present in the Detected Wave Component Database, the Ship State Prediction function calculates the phase of the wave during the prediction window. The appropriate gains $G_i$ and phase lags $\phi_{L_i}$ are computed by an interpolation in the transfer function database before equation (12) is computed six times, one per each degree of freedom.

It is these predictions which are utilized to compare with the Ship Helicopter Operating Limit (SHOL) criteria. That is, each of the six variables pitch, roll, yaw, etc. are predicted, and a safe operating threshold is defined for each of them. The predictions are examined for a period commencing 20 seconds and ending forty seconds into the future. A prediction is thus made for each of the one-second periods in this 20 second interval. If any of the six variables exceed their allowable threshold for any one of these periods, that period is regarded as unsafe. If all six values are within their threshold values, the period is regarded as quiescent. A determination is made as to when there is a sequence of a predetermined number of acquiescent periods. The comparison is recalculated as each second passes, so that the next calculation covers seconds 21 to 41, as it were. The results of this comparison are utilized to control the message signal for the pilot. In its simple form, the message may simply cause a light to go green when a predetermined number of seconds remain before the quiescent interval.

If any predictions within the landing window exceed the landing criteria, appropriate indication, such as a message signal, is provided for three parties, namely, the pilot, the flight deck officer, and the bridge.

Figure 8:
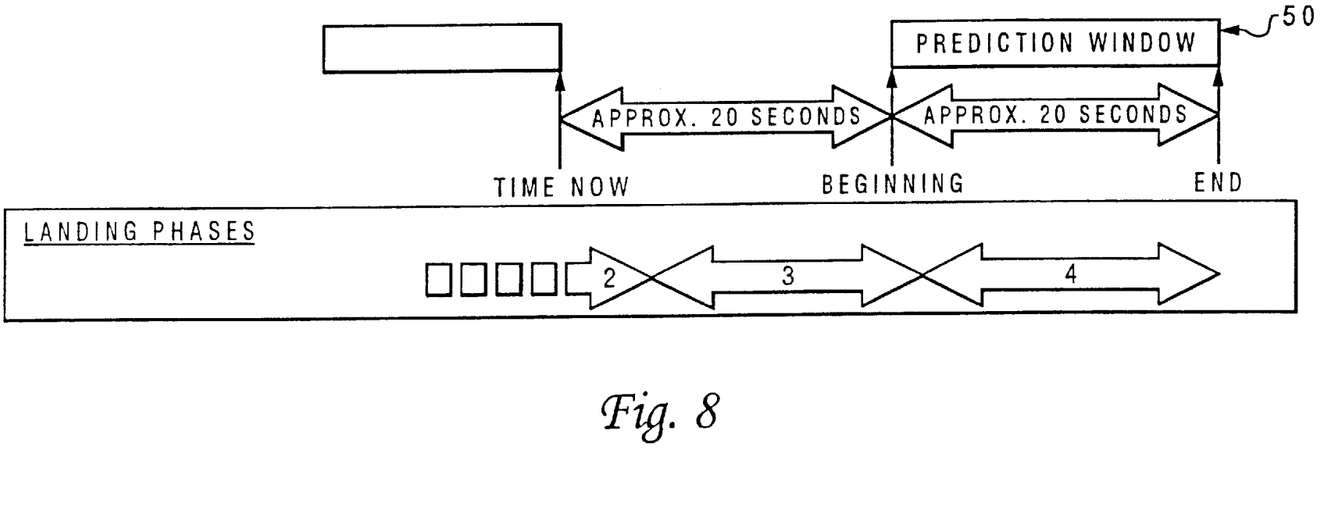
FIG. 8 is a block diagram depicting various phases of a landing operation.

Referring now to FIG. 8, there is illustrated a block diagram depicting various phases of a helicopter landing operation. During phase 2 of the helicopter landing (time 0), the present invention can identify a quiescent period of the ship motion within a prediction window 50 which is located at about 21 to 40 seconds into the future, and sends a message signal to the pilot of the helicopter indicating such.

Any type of message sending method would be acceptable. However, illumination of colored lights (or other visual indication) on the flight deck of the ship is considered as most preferable because it is simple and does not require any addition equipment on the helicopter, and can be utilized by any pilot. All that is necessary is for the light to change color a specified number of seconds before the best time for the pilot to land. The system depicted in FIG. 1 is more sophisticated than this, however, and involves the transmission to the pilot of a radio message indicating the time-to-land in seconds, and the duration of the quiescent period.

In an improved version of the system, the predictions can be stored and compared with the actual ship motion. The prediction errors can be utilized to adjust the response transfer functions or ROAs over time so as to improve the agreement between the predictions and the actual motion for the ship for future predictions.

The repetition rates for the various steps involved are as follows. A first set of steps is executed once per second. These are:

(a) ship state measurements—measurements of attitude, heave and speed;
(b) ship state predictions—using the current values for the calculated wave components (amplitude, phase, direction), calculating the future ship state using the stored RAOs;
(c) evaluating the SHOL criteria—providing an indication of when a quiescent state is expected.

Every two seconds a scan is made so that scan measurements two seconds apart can be compared, as discussed above. This may involve some azimuth rotation. The wave component isolation processing is executed once every four seconds. This comprises the so-ordinate transformation, Fourier analysis, calculation of the angle $\alpha$, and updating the wave component database. Finally, every ten seconds the sectors are checked by looking at a different azimuth direction.

As has been described, the present system provides an improved method and system for providing a short-term prediction of future ship motion at sea for enhancing visual cueing information which can be remotely presented to a pilot during a helicopter-landing approach. In accordance with the preferred embodiment of the present invention, a helicopter pilot is provided with a form of visual cueing information, based on a short-term prediction of future ship motion, which he can utilize from the cockpit to ensure his final landing approach coincides with a period of quiescent ship motion. In addition, the present system also provides the ship command with a tool to predict what heading change or speed change would be required, given the current sea state conditions, to bring the ship motion within a safe helicopter operation envelope.

The short-term prediction scheme could also be applicable for providing a feed-forward compensation signal to an active stabilization system of a ship in order to reduce roll rates and excursions. It may be applicable to other craft, e.g. aircraft, or even to road vehicles.

While the invention has been particularly shown and described with reference to a preferred embodiment, it will be understood by those skilled in the art that various changes in form and detail may be made therein without departing from the spirit and scope of the invention.

What is claimed is:

1. A method for a short-term prediction of future ship motion to provide visual cueing information that can be remotely presented to a pilot during an aircraft landing approach, said method comprising the steps of:

acquiring a plurality of samples of a sea surface geometry along a radial azimuth line from a ship as a function of elevation;

deriving a wave trace from said acquired samples;

processing said wave trace together with a pre-defined motion characteristic of said ship in order to derive a short-term prediction of future motion of said ship in time domain;

locating a quiescent period of said future motion of said ship by comparing said short-term prediction with some operating limit criteria of an aircraft; and after said quiescent period has been located, indicating to said pilot to land aircraft.

2. The method according to claim 1, wherein said acquiring step further includes a step of acquiring each sample at an incremental steps of once every ten meters along the sea surface per entire range measurement.

3. The method according to claim 1, wherein said acquiring step is performed within one second.

4. The method according to claim 1, wherein said method further includes a second acquiring step.

5. The method according to claim 4, wherein said second acquiring step is performed approximately two seconds after said acquiring step.

6. The method according to claim 1, wherein said deriving step further includes a step of converting said plurality of samples from a ship-fixed reference frame to an earth-fixed coordinate reference frame.

7. The method according to claim 1, wherein said deriving step further includes a step of converting said plurality of samples from a polar co-ordinate frame of reference to a Cartesian co-ordinate frame of reference.

8. The method according to claim 1, wherein said processing step further includes a step of performing a Fast Fourier Transform to identify individual wavelength components.

9. The method according to claim 1, wherein said processing step further includes a step of measuring a change of phase of a wave component along said radial azimuth line and determining a direction of travel of said wave component from a measured phase change and a measured wavelength.

10. The method according to claim 1, wherein said processing step further includes a step of extrapolating a prediction forward in time.

11. The method according to claim 1, wherein said locating step further includes a step of comparing said short-term prediction with some operating limit criteria of a helicopter.

12. The method according to claim 1, wherein said indicating step further includes a step of providing a visual indication that can be seen by said pilot.

13. The method according to claim 1, wherein said indicating step further includes a step of transmitting a message signal to said pilot indicating a location in time of said quiescent period.

14. A method of predicting future motion, said method comprising the steps of:
   acquiring a plurality of samples of a surrounding geometry along a radial azimuth line as a function of elevation;
   deriving a wave trace from said acquired samples;
   performing a spatial domain to frequency domain transform on said wave trace to identify individual wavelength components acting to cause said motion; and
   processing said components together with a pre-defined motion characteristic in order to derive a short-term prediction of future motion in the time domain.

15. The method according to claim 14, wherein said processing step further includes a step of measuring a change of phase component along said radial line, and determining a direction of travel of said wave component from a measured phase change and a measured wavelength.

16. A system for providing an active stabilization to a sea vessel, said system comprising:
   a sensor for acquiring a plurality of samples of the sea surface geometry along a radial line from said sea vessel as a function of elevation and azimuth of said sensor;
   means for deriving a wave trace from said acquired samples;
   means for processing said wave trace together with a pre-defined motion characteristic of the ship in order to derive a short-term prediction of future ship motion in time domain; and
   means for transmitting a feed-forward compensation signal to an active stabilization system within said sea vessel.

17. The system according to claim 16, wherein said means for deriving further includes means for converting said plurality of samples from a ship-fixed reference frame to an earth-fixed coordinate reference frame.

18. The system according to claim 16, wherein said means for deriving further includes a means for converting said plurality of samples from a polar co-ordinate frame of reference to a Cartesian co-ordinate frame of reference.

19. The system according to claim 16, wherein said means for processing further includes a means for performing a Fast Fourier Transform to identify individual wavelength components.

20. The system according to claim 16, wherein said means for processing further includes a means for measuring a change of phase of a wave component along said radial azimuth line and determining a direction of travel of said wave component from a measured phase change and a measured wavelength.

21. An apparatus for predicting future motion, comprising:
   means for acquiring a plurality of samples of a surrounding geometry along a radial azimuth line as a function of elevation;
   means for deriving a wave trace from said acquired samples;
   means for performing a spatial domain to frequency domain transform on said wave trace to identify individual wavelength components acting to cause said motion; and
   means for processing said components together with a pre-defined motion characteristic in order to derive a short-term prediction of future motion in time domain.

22. The apparatus according to claim 21, wherein said processing means includes means for measuring the change of phase of a wave component along the said radial line, and means for determining the direction of travel of the component from the measured change and the measured wavelength.

* * * * *